(12) United States Patent
Calandrini et al.

(10) Patent No.: US 8,678,834 B2
(45) Date of Patent: Mar. 25, 2014

(54) DEVICE FOR DEMONSTRATING AND TESTING THE EFFECTIVENESS OF AN ANTI-REFLECTIVE TREATMENT OF AN OPHTHALMIC LENS

(75) Inventors: Fabien Calandrini, Charenton-le-Pont (FR); Carole Nadolny, Charenton-le-Pont (FR); Catherine Fauquier, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 356 days.

(21) Appl. No.: 13/143,115

(22) PCT Filed: Oct. 15, 2009

(86) PCT No.: PCT/FR2009/051963
§ 371 (c)(1),
(2), (4) Date: Sep. 21, 2011

(87) PCT Pub. No.: WO2010/081945
PCT Pub. Date: Jul. 22, 2010

(65) Prior Publication Data
US 2012/0002208 A1 Jan. 5, 2012

(30) Foreign Application Priority Data
Jan. 15, 2009 (FR) ...................................... 09 50195

(51) Int. Cl.
*G09B 23/28* (2006.01)
*G09B 25/00* (2006.01)
*G02C 7/02* (2006.01)
*G02C 3/00* (2006.01)

(52) U.S. Cl.
USPC ... 434/367; 434/365; 351/159.01; 351/159.6; 351/159.63

(58) Field of Classification Search
USPC ........ 434/365, 399, 367; 351/159.09, 159.55, 351/159.6, 159.65
See application file for complete search history.

(56) References Cited

U.S. PATENT DOCUMENTS

| 3,047,966 A | 8/1962 | Greenspan | |
|---|---|---|---|
| 4,505,683 A | 3/1985 | Schuerle | |
| 7,621,750 B1 * | 11/2009 | Boinard et al. | 434/365 |
| 7,775,799 B2 * | 8/2010 | Reiber | 434/303 |
| 8,379,195 B2 * | 2/2013 | Cado | 356/124 |

FOREIGN PATENT DOCUMENTS

| DE | 102007028364 | 12/2008 |
|---|---|---|
| EP | 1174061 | 1/2002 |
| WO | 2008023134 | 2/2008 |
| WO | 2008047045 | 4/2008 |

* cited by examiner

*Primary Examiner* — Kathleen Mosser
*Assistant Examiner* — Peter J Alley
(74) *Attorney, Agent, or Firm* — Sofer & Haroun, LLP

(57) ABSTRACT

A device for demonstrating and comparatively testing the effectiveness of an antireflection treatment for an ophthalmic lens, the device comprising an image (2, 20) and a mirror (3, 30). According to the invention, the device further comprises a part (1, 10) having a first face (1A, 10A) for supporting said image (2, 20), a second face (1B, 10B) for supporting said mirror (3, 30) substantially perpendicularly to said first face, and a third face (1C, 10C) for positioning at least one ophthalmic lens, the third face being situated. facing said second face and being provided with a positioning arrangement for positioning said lens (4', 4", 40), the arrangement comprising at least one orifice (4A, 4B, 40A) arranged in said third face facing said mirror, in such a manner that when a user looks through said orifice, the user can see the resulting reflection of said image on said lens by means of said mirror (3, 30).

21 Claims, 3 Drawing Sheets

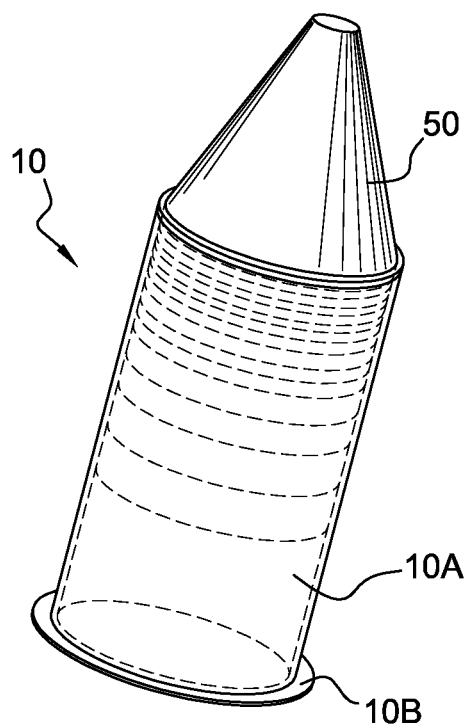
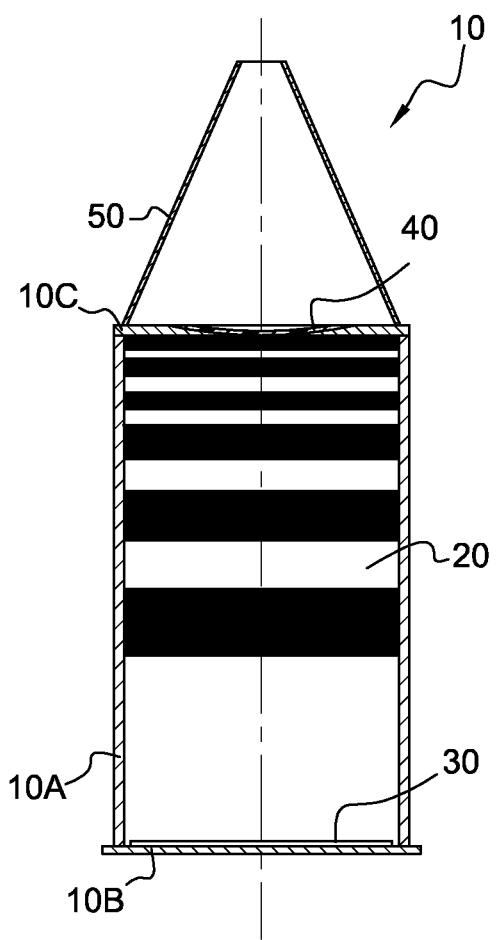

DEVICE FOR DEMONSTRATING AND TESTING THE EFFECTIVENESS OF AN ANTI-REFLECTIVE TREATMENT OF AN OPHTHALMIC LENS

This application is a National Phase application of PCT/FR2009/051963, which in turn claims the benefit of priority front French Patent Application No. 09 50195 filed on Jan. 15, 2009, the entirety of which is incorporated by reference.

BACKGROUND

1. Field of the Invention

The invention relates to a. device for demonstrating and comparatively testing the effectiveness of an antireflection treatment for an ophthalmic lens.

2. Description of Related Art

Devices exist for measuring the optical properties of an antireflection treatment by means of a reflection measurement system of the complex spectrometer type. The optical properties in question are mean reflection $R_m$, visual reflection $R_v$, chroma C, and hue angle h.

There also exists a method of demonstrating the effectiveness of an antireflection treatment in which the performance of a lens provided with an antireflection treatment is compared. with a lens that does not have such a treatment, by means of a right image and a left image reflected on right and left ophthalmic lenses worn by a wearer by means of an eyeglass frame, one of the lenses being provided with an antireflection treatment and the other one not having such a treatment. The reflections of the images are viewed by the wearer on looking in a central mirror, or else they are viewed by an observer. The wearer or the observer compares the differences between the two lenses to assess the effectiveness of the antireflection treatment.

OBJECTS AND SUMMARY

That type of method is not associated. with any protocol and it is therefore relatively inaccurate and at random in so far as it depends on observation conditions.

The invention proposes a device for demonstrating and comparatively testing the effectiveness of two antireflection treatments deposited on ophthalmic lenses. The device is simple to use, and can be used equally well as a demonstrator for opticians or as a measuring instrument, and it is easily used by a person without training. The device makes it possible to evaluate differences of less than 0.5% in the visual reflection $R_v$ between two antireflection treatments.

To do this, the invention proposes a device for demonstrating and comparatively testing the effectiveness of an antireflection treatment for an ophthalmic lens, the device comprising an image and a mirror, the device being characterized in that it further comprises a part having a first face for supporting said image, a second face for supporting said mirror substantially perpendicularly to said first face, and a Third face for positioning at least one ophthalmic lens, the third face being situated facing said second face and being provided with a positioning arrangement for positioning said lens, the arrangement comprising at least one orifice arranged in said third face facing said mirror, in such a manner that when a user looks through said orifice, the user can see the resulting reflection of said image on said lens by means of said mirror.

In a first preferred embodiment of the invention, said part is a channel section member with flanges constituting said second face and said third face.

In a second preferred embodiment of the invention, said part is a closed cylinder, with the end disks thereof constituting said second face and said third face.

The invention also provides a use of a device according to the second embodiment, the use consisting in taking a lens provided on a first half with a first antireflection treatment and provided on a second-half with a second antireflection treatment, in placing the lens on said orifice with its concave face turned outwards, in looking in monocular manner through the lens, and in viewing the resulting reflections with the help of said mirror in order to compare the reflection levels of the reflections of said image as reflected on said first half and on said second half.

Finally, the invention provides a use of a device according to the first embodiment, consisting in placing a lens provided with a first antireflection treatment on one of said orifices and another lens provided with a second antireflection treatment on the other of said orifices, the concave faces of the lenses being turned outwards, in looking in binocular manner through the two lenses, and in viewing the resulting reflections with the help of said mirror in order to compare the reflection levels of she reflections of said image as reflected on each of she lenses.

BRIEF DESCRIPTION OF THE DRAWINGS

The invention is described below in greater detail with the help of figures that merely show preferred embodiments of the invention.

FIG. 4 is a perspective view of this device in accordance with a second embodiment of the invention.

FIG. 5 is a longitudinal section view of this device in accordance with a second embodiment of the invention.

DETAILED DESCRIPTION

Figure 1:
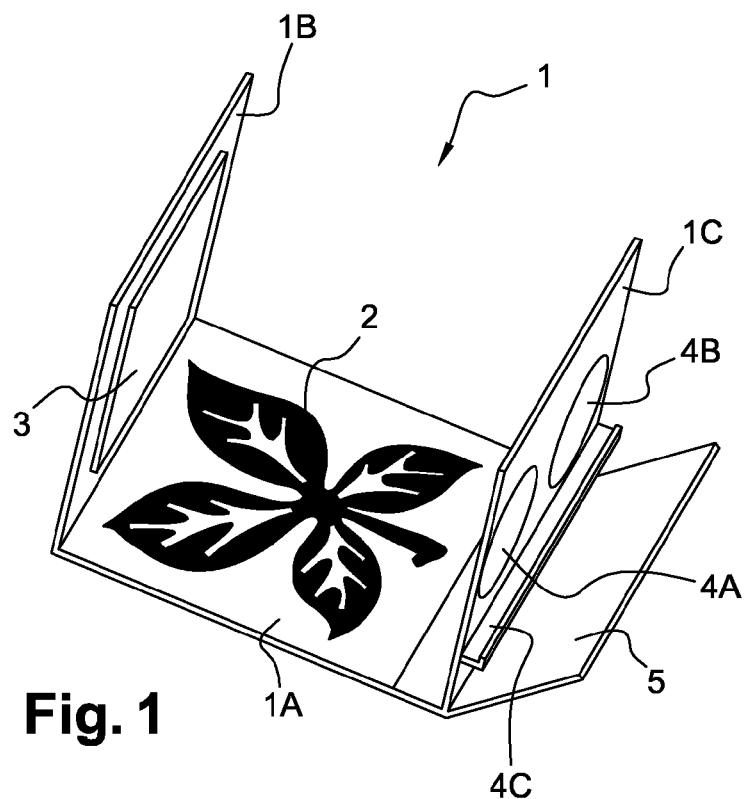
FIG. 1 is a perspective view of a device for demonstrating and testing the effectiveness of an antireflection treatment of an ophthalmic lens in a first embodiment of the invention.
Figure 2:
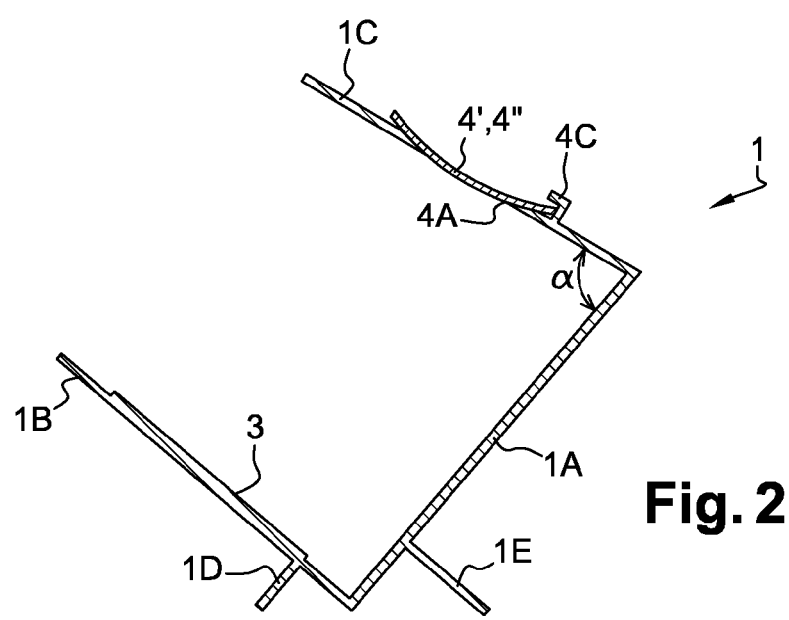
FIG. 2 is a cross-section view of this device in accordance with a first embodiment of the invention.

FIGS. 1 and 2 show a device 1 for demonstrating and testing the quality of an antireflection treatment of an ophthalmic lens in accordance with a first embodiment of the invention.

This device 1 comprises a part made of transparent plastics material constituting a channel section, having a first face 1A supporting an image 2 stuck on said face, a second face 1B supporting a mirror 3 substantially perpendicularly to the first face 1A and forming one of the flanges of the channel section, and a third face 1C for positioning at least one ophthalmic lens 4', 4", situated facing the second face 1B, forming the second flange of she channel section, and provided with an arrangement for positioning the lens, which arrangement comprises at least one orifice, here two orifices 4A, 4B, arranged in said third face 1C together with a support rest 4C arranged under the orifices 4A, 4B arranged on the third face.

These orifices 4A, 4B are circular and they have a diameter of about 50 millimeters (mm).

The third face 1C has a frosted finish so as to avoid having interfering reflections on the mirror 3.

The third face 1C is inclined at an angle α of about 80° relative to the first face 1A. The second face if and the third face 1C are spaced apart by a distance lying in the range 15 centimeters (cm) to 30 cm, and preferably equal to 17 cm.

The device 1 also includes a mask 5 secured to the third face 1C and serving to provide a uniform background for observing reflections. The mask 5 is a plain opaque wall, preferably matt black, and it is pivotally mounted about the side that is common to the first face 1A and the third face 1C.

The part 1 also preferably includes two legs 1D, 1E enabling it to stand on a horizontal surface at an inclination of 45°, as shown in FIG. 2, thereby providing a position that is comfortable relative to an observer.

The image 2 presents a matt white background together with at least one matt black pattern, with contrast of 100%, preferably an optotype corresponding to the scale 0.1 of the Monoyer acuity test at 5 meters (m).

The use of such a device consists in positioning a zero-power lens 4' against one of the orifices 4A, the lens being provided with a first antireflection treatment, and positioning another zero-power lens 4" against the other orifice 4B, the other lens being provided with a second antireflection treatment, with the concave faces of both lenses facing outwards and upwards, then in looking in binocular manner through the two lenses 4', 4", and in viewing the resulting reflections on the mirror 3 in order to compare the reflection levels of the reflections of the image 2 as reflected on the concave faces of the respective lenses.

The mask 5 is pivoted upwards so as to hide the bottom portion corresponding to the reflection of the observer's face, thereby providing a uniform observation background. This makes it easier to observe the reflections.

By appropriately selecting the dimensions of the part 1 and of the image 2, the reflection of the image 2 is large enough to enable the observer to compare the reflections of the image 2 as reflected on each of the lenses, with the less effective antireflection treatment presenting a reflection of the image that is more visible. This perceived reflection thus presents a dimension of the order of 1 cm to 3 cm.

The arrangement for positioning the lens need have only one orifice in the third face 1C.

The use of the device then consists in positioning a zero power lens against the orifice with the concave face of the lens facing outwards and upwards, the lens being provided on a first half with a first antireflection treatment and on a second half with a second antireflection treatment. The boundary between the two halves is positioned vertically relative to the device. The observer looks through the lens and views the resulting reflections in the mirror 3 in order to compare the reflection levels of the reflections of said image as reflected on the first half and on the second half of the convex face of the lens.

Figure 3:
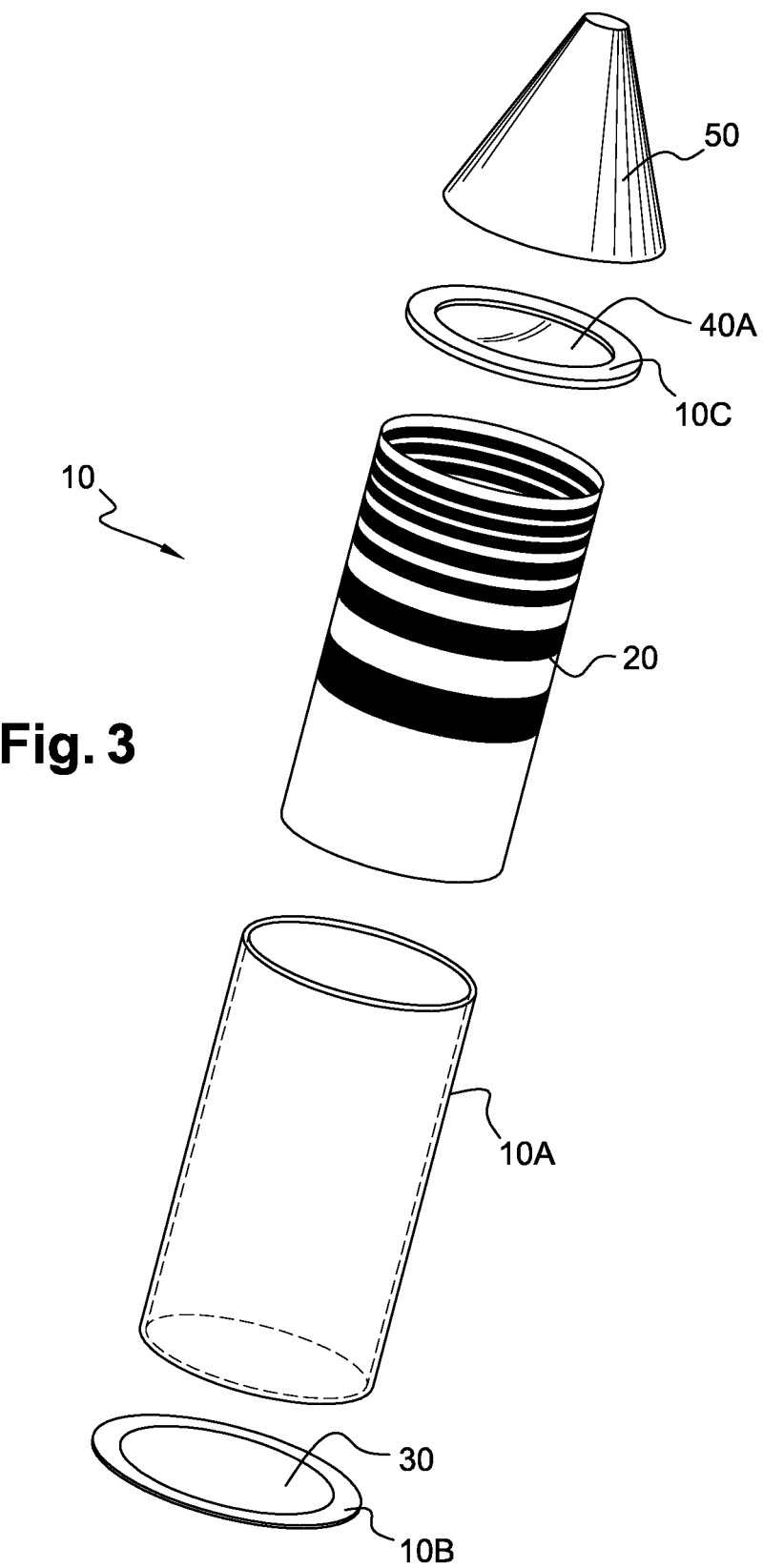
FIG. 3 is an exploded perspective view of a device for demonstrating and testing the effectiveness of an antireflection treatment of an ophthalmic lens in accordance with a second embodiment of the invention.

FIGS. 3 to 5 show a device 10 for demonstrating and testing the effectiveness of an antireflection treatment of an ophthalmic lens in accordance with a second embodiment of the invention.

This device 10 comprises a part made of transparent plastics material constituting a closed cylinder, having a first face 10A for supporting an image 20 stuck on said face, a second face 10B for supporting a mirror 30 substantially perpendicularly to the first face 10A and forming an end wall disk of the cylinder, and a third face 10C for positioning an ophthalmic lens 40, the third face being situated facing the second face 10B, and forming the other end disk of the cylinder, being provided with an arrangement for positioning the lens and including an orifice 40A.

The orifice 40A is circular with a diameter of about 50 mm.

The length of the cylinder lies, in the range 20 cm to 50 cm and is preferably equal to 30 cm.

The device 10 also includes a mask 50 secured to the third face 101 and serving to provide a uniform observation background. The mask 50 is an opaque open conical wall, preferably colored matt black, suitable for being secured on the third face 10C. This mask may also be in the form of a plane mask having an orifice of approximately 2 cm pierced in its center.

The image 20 presents a matt black background and at least one matt black pattern, with contrast of 100%, preferably constituted by a set of annular parallel, lines corresponding to cross-sections of the cylinder and of decreasing width.

The use of such a device consists in placing a zero-power lens 40 against the orifice 40A with its concave face facing outwards and upwards, the lens being provided on a first half with a first antireflection treatment and on a second half with a second antireflection treatment, in looking in monocular manner through the lens 40A, and in viewing the resulting reflections on the mirror 30 in order to compare the reflection levels of the reflections on the concave face of the lens of said image as reflected on the first half and on the second half.

The mask 50 is secured to the third face 10C so as to provide a uniform observation background.

By an appropriate choice for the dimensions of the part 10 and of the image 20, the reflection of the image 20 is large enough to enable the observer to compare the reflections of the image 20 as reflected on each of the halves of the lens, with the antireflection treatment having the lower effectiveness presenting a reflection of said image that is more visible.

Use is performed in an environment that is well lit, preferably in daylight.

In the embodiments described, the image 2, 20 is plane; however the image could be replaced by a three-dimensional article.

This image or this article is centered on the plane of symmetry containing the center of the lens-positioning orifice when there is only one of them, or on the midpoint between the two orifices when there are two of them.

The mirror 3, 30 is a plane mirror, preferably of a symmetrical square or round shape. It is centered on the positioning orifice for the lens when there is only one of them, or on the midpoint between the two orifices when there are two of them.

The mirror is not adjacent to the article or to the image, so as to avoid having a direct reflection of the article or of the image on the mirror. The mirror 3 does not cover the entire first face 1B, as can clearly be seen in FIG. 1. A bare surface having a width of about 2.5 cm surrounds it. As can clearly be seen in FIGS. 4 and 5, the mirror 30 is substantially identical to the inside diameter of the tube 10A and it is not adjacent to the image 20. They are spaced apart by a distance of 6 cm.

The or each lens may be placed against the third face 1C, 10C as described above, or may be secured to said face, e.g. by adhesive.

In order to avoid disturbing viewing through the or each lens, it or they are preferably afocal and plano-spherical.

When the device is used with two lenses, they are of identical base and have the same refractive index.

The invention claimed is:

1. A device for demonstrating and comparatively testing the effectiveness of an antireflection treatment for an ophthalmic lens, the device comprising:
an image; and
a mirror,
wherein said device further has a part having a first face for supporting said image,
a second face for supporting said mirror substantially perpendicularly to said first face, and a third face for positioning at least one ophthalmic lens, the third face being situated facing said second face and being provided with a positioning arrangement for positioning said lens, the arrangement comprising at least one orifice arranged in said third face facing said mirror, in such a manner that when a user looks through said orifice, the user can see the resulting reflection of said image on said lens in said mirror.

2. A device according to claim 1, wherein said device includes a mask secured to said third face and is designed to provide a uniform background for observing reflections.

3. A device according to claim 2, wherein said mask is an opaque plane wall pivoting about the side common to the first face and the third face.

4. A device according to claim 2, wherein said mask is an opaque open conical wall suitable for securing on the third face.

5. A device according to claim 1, wherein said image is an image representing a matt white background and at least one matt black pattern.

6. A device according to claim 5, wherein said image is an optotype corresponding to the scale 0.1 of the Monoyer acuity test at 5 m.

7. A device according to claim 5, wherein said image is constituted by a set of annular parallel lines corresponding to cross sections of said cylinder.

8. A device according to claim 1, said part is a channel section member with flanges constituting said second face and said third face.

9. A device according to claim 8, wherein said third face is inclined at an angle of about 80° relative to the first face.

10. A device according to claim 8, wherein said second face and said third face are spaced apart by a distance of 15 cm to 30 cm.

11. A device according to claims 8, wherein said lens positioning arrangement includes a support rest arranged under said orifice arranged on said third face.

12. A device according to claim 1, wherein said part is a closed cylinder, with the end disks thereof constituting said second face and said third face.

13. A device according to claim 12, wherein the length of said cylinder lies in the range 20 cm to 50 cm.

14. A device according to claim 1, wherein said part is made of transparent plastics material.

15. A device according to claim 1, wherein said third face has a frosted finish.

16. A method for employing a device according to claim 1, said method comprising the steps of:
    taking a lens provided on a first half with a first antireflection treatment and provided on a second-half with a second antireflection treatment;
    placing the lens on said orifice with its concave face turned outwards;
    looking in monocular manner through the lens; and
    viewing the resulting reflections on said mirror in order to compare the reflection levels of the reflections of said image as reflected on said first half and on said second half.

17. The method as claimed in claim 16 wherein a mask, secured to said third face and designed to provide a uniform backround for observing reflections, and is an opaque plane wall pivoting about the side common to the first face and the third face, is pivoted upwards so as to obtain a uniform observation background.

18. The method as claimed in claim 16 wherein a mask, secured to said third face and designed to provide a uniform backround for observing reflections, and is an opaque conical wall suitable for securing on the third face, is secured to said third face.

19. A method for employing a device according to claim 1, and having two of said orifices, said method comprising the steps of:
    placing a lens provided with a first antireflection treatment on one of said orifices and another lens provided with a second antireflection treatment on the other of said orifices, the concave faces of the lenses being turned outwards;
    looking in binocular manner through the two lenses; and
    viewing the resulting reflections with the help of said mirror in order to compare the reflection levels of the reflections of said image as reflected on each of the lenses.

20. The method as claimed in claim 19, wherein a mask, secured to said third face and designed to provide a uniform background for observing reflections, and is an opaque plane wall pivoting about the side common to the first face and the third face, is pivoted upwards so as to obtain a uniform observation background.

21. The method as claimed in claim 19, wherein a mask, secured to said third face and designed to provide a uniform background for observing reflections, and is an opaque open conical wall suitable for securing on the third face, is secured to said third face.

* * * * *

UNITED STATES PATENT AND TRADEMARK OFFICE
CERTIFICATE OF CORRECTION

| | | |
|---|---|---|
| PATENT NO. | : 8,678,834 B2 | Page 1 of 1 |
| APPLICATION NO. | : 13/143115 | |
| DATED | : March 25, 2014 | |
| INVENTOR(S) | : Calandrini et al. | |

It is certified that error appears in the above-identified patent and that said Letters Patent is hereby corrected as shown below:

In the Claims

Column 6, Claim 18, Line 21: Between the words "opaque" and "conical" the word --open-- should be inserted Signed and Sealed this
Twenty-seventh Day of May, 2014

Michelle K. Lee
*Deputy Director of the United States Patent and Trademark Office*